J. E. METHVIN.
HARVESTING PLOW.
APPLICATION FILED NOV. 3, 1917.
1,266,701.
Patented May 21, 1918.
2 SHEETS—SHEET 2.
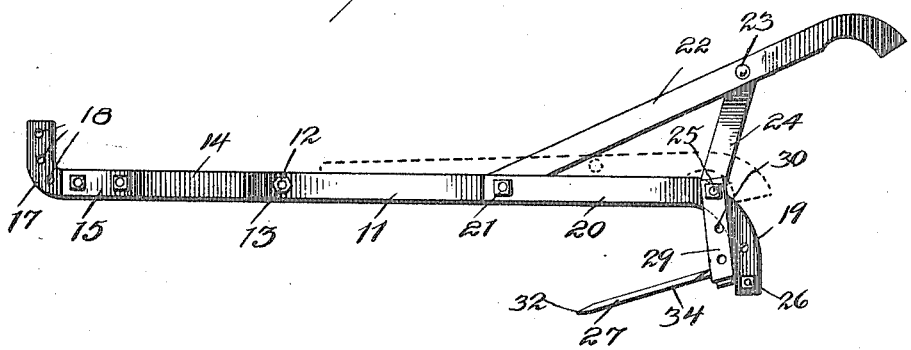
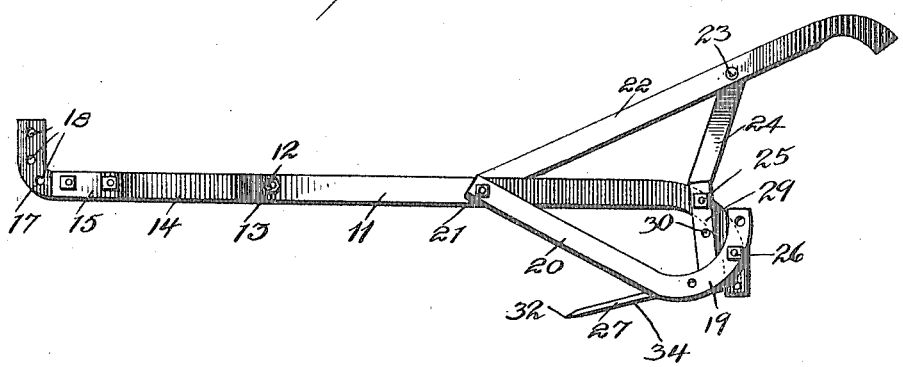
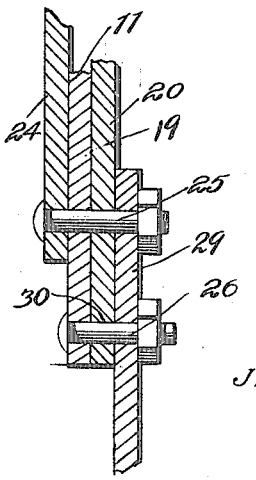
WITNESSES
George A. Myers.
INVENTOR
JAMES E. METHVIN,
BY
ATTORNEYS

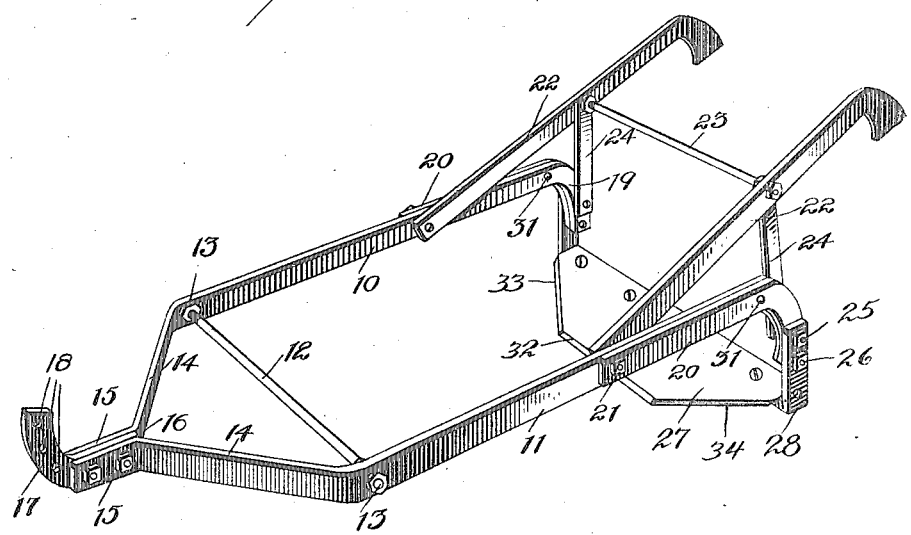
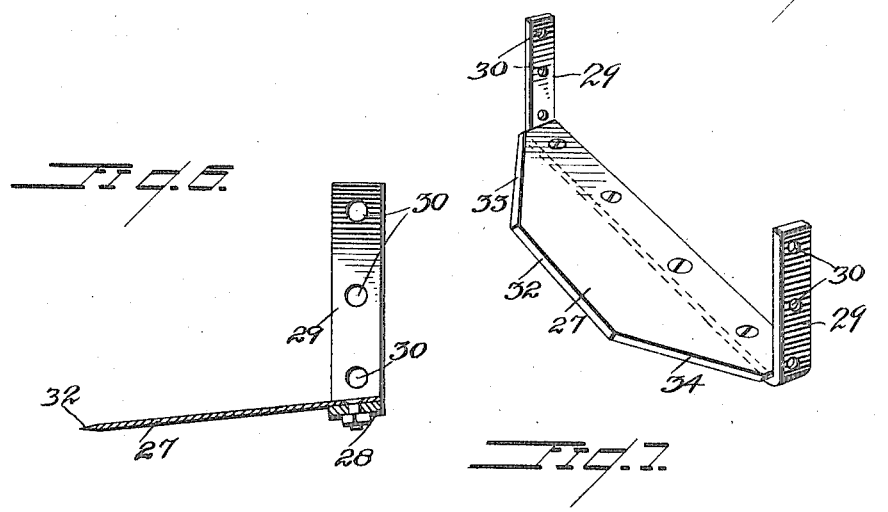
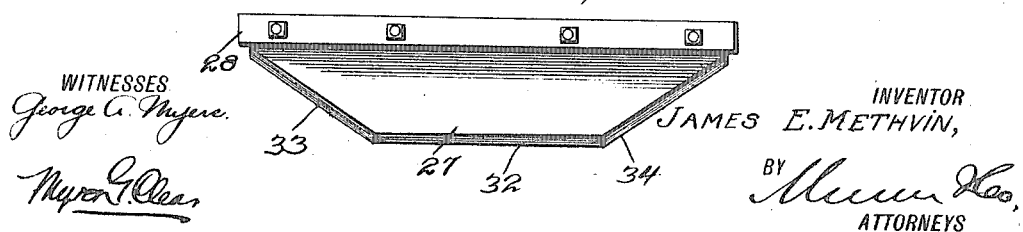

UNITED STATES PATENT OFFICE.

JAMES E. METHVIN, OF EUFAULA, ALABAMA, ASSIGNOR OF ONE-THIRD TO FRANCIS M. GAY, OF EUFAULA, ALABAMA, ONE-SIXTH TO HUGH A. GAY, OF GEORGETOWN, GEORGIA, AND ONE-SIXTH TO LEE OMAR GAY, OF FORT GAINES, GEORGIA.

HARVESTING-PLOW.

1,266,701.  Specification of Letters Patent.  Patented May 21, 1918.

Application filed November 3, 1917. Serial No. 200,110.

*To all whom it may concern:*

Be it known that I, JAMES E. METHVIN, a citizen of the United States, and a resident of Eufaula, in the county of Barbour and State of Alabama, have made certain new and useful Improvements in Harvesting-Plows, of which the following is a specification.

My present invention relates generally to plows capable of a variety of uses, and more particularly to an implement intended primarily for harvesting peanuts, my object being the provision of a simple, inexpensive, and quickly adjustable plow for this purpose, in the utilization of which, in connection with certain characters of peanuts, the roots will be clipped or cut off, and parts thereof left in the ground in order to supply nitrogen thereto.

It is to be understood, however, that the machine which I will now describe, while primarily intended for use in connection with peanuts, is capable of a great variety of uses, and may be utilized in the soil for preparing the same for crops and to effectively break up the ground without formation of furrows.

In the accompanying drawing illustrating my present invention:—

Figure 1 is a perspective view of my improved harvesting plow complete with the parts adjusted to one position, Fig. 2 is a side elevation thereof with the parts adjusted to another position, Fig. 3 is a view similar to Fig. 2 with the parts adjusted to still another position, Fig. 4 is an enlarged vertical section through certain of the connections with the parts in the position shown in Fig. 1, Fig. 5 is a perspective view of the plowing blade and its shank, Fig. 6 is a vertical section therethrough, and, Fig. 7 is a bottom plan view thereof.

Referring now to these figures, the frame of my improved plow consists of a pair of widely separated parallel frame bars 10 and 11, which are braced adjacent their forward ends by a transverse brace rod 12 secured at its ends 13 to the said frame bars. The forward extremities of these bars forwardly of the brace bar 12, are disposed at convergent angles as at 14, the ends 15 thereof being bent in parallelism at opposite sides of, and securely bolted to the horizontally disposed portion 16 of a clevis or draft attaching piece, the forward portion of which is bent to upstand, as seen at 17, and provided with a vertical series of openings 18.

The rear ends of the bars 10 and 11 are bent downwardly, as seen at 19, and along their rear portions, and upon their outer faces are disposed similarly shaped adjusting bars 20, the latter being bolted at their forward ends by bolts 21 to the said frame bars at points intermediate the ends of the latter, which bolts 21 also serve to connect the lower forward ends of rearwardly and upwardly inclined handles 22, as seen particularly in Fig. 1.

The handles 22 are braced by an intermediate transverse rod 23 from adjacent the opposite ends of the latter of which depend brace straps 24, the latter connected in adjustable positions with respect to the frame in several manners, which will be presently specified.

The rear down-turned coincidently curved ends of the frame bars 10 and 11 and the adjusting bars 20 carried thereby in the manner before specified, have pairs of transversely alined and vertically spaced openings through which are adapted to extend connecting bolts 25 and 26, certain of which also extend through the lower ends of the straps 24 to support the latter in one of the adjusted positions, as seen in Fig. 1.

The plow in the present construction consists of a flat blade 27, which in the operative position, as seen in Fig. 1, extends transversely between the side bars 10 and 11 of the frame and below the rear ends of the latter in forwardly and downwardly inclined relation, the rear edge of this plow blade 27 being securely bolted to the intermediate cross bar 28 of a U-shaped plow shank, the extensions 29 of which upstand at opposite sides of the blade and have openings 30 for the reception of the bolts 25 and 26 in an adjustable manner, whereby the plane of the plow blade 27 may be raised and lowered with respect to the planes of the frame bars 10 and 11.

Thus, as shown in Fig. 1, where the bolts 25 and 26 extend through the upper openings 30, the blade 27 is in lowermost position, which may be varied by extending the said bolts through the two lower openings of the plow shank. At the upper portions of their rear bends the frame bars 10 and 11 and their adjusting bars 20 have transversely alined openings 31 by means of which the upper openings 30 of the plow shanks 29 may be bolted, as seen in Fig. 2, to adjust the plow blade to its upper position, in which the rear edge of the plow blade and the cross bar 28 of the plow shank will be engaged against and supported by the lower portions of the bent rear extensions of the frame in use.

As seen in Fig. 1, the parts with the plow blade adjusted to its lower position may be used in substantially level ground either in the harvesting of crops or preparing of ground for the crops, while as seen in Fig. 2, the parts with the plow adjusted to its upper position, may be utilized for the harvesting of crops planted in hills, and it is to be noted particularly in this latter connection that the adjusting bars 20 are capable of attachment in reverse position, that is, with their curvature reversed with respect to the curvature of the frame bars, as seen in Fig. 3, in order to act as runners within the furrows between hills so as to support the entire frame in use and obviate any tendency of the plow to dig too deeply.

Referring again to the plow blade 27, it is to be particularly noted that it has a forward square edge 32 extending substantially in parallelism with its rear edge connected as before described, and is provided with angular edges 33 and 34 at the sides of the square edge 32, these edges being beveled downwardly and sharpened as shown particularly in Fig. 6, so that in the harvesting of crops or the preparation of soil, the plow blade will readily pass through the soil below its surface without tendency to shift in either one direction or the other, and maintaining itself substantially in a straight line, such as could not be brought about by the use of a pointed plow, as usual. Furthermore, in the harvesting of crops it is apparent that the plow proposed by my invention will up-root and in connection with some plants in particular will clip the roots so as to permit of ready removal of the plants and obviate the usual disadvantages caused by partly or wholly covering the plants with turned-over soil.

In preparing my improved plow as a whole for shipment, it is to be observed that by releasing the connecting bolts 21 in so far as the handles 22 are concerned, the latter may be moved forwardly and downwardly upon the bolts 25 through the lower ends of their supporting straps 24, and thus positioned in substantially parallel positions adjacent the frame bars 10 and 11, providing for a more compact shipping structure and requiring less space. See Fig. 2.

I claim:—

1. A plow of the character described comprising a frame having forward draft attaching means including spaced side bars provided with down-turned rear ends, adjusting bars bolted at their forward ends to the frame bars intermediate the ends of the latter and having their rear ends down-turned at the sides of the down-turned rear ends of said side bars, said side bars and said adjusting bars having alined openings, bolts extending through said openings, and a transversely extending plow blade having upright side shanks apertured to receive the said bolts whereby to adjustably connect the blade with the frame.

2. A plow of the class described comprising a horizontally disposed substantially rectangular frame having forward draft attaching means, and including parallel side bars provided with down-turned rear ends, adjusting bars having down-turned portions at one end, means to connect the adjusting bars with their curvature paralleling and reversely disposed with respect to the rear curved portions of the frame and side bars, a plow blade extending below and transversely of the rear portion of the main frame, a U-shaped shank to the cross bar of which the plow blade is secured, and means for adjustably connecting the extensions of said shank to the curved portions of the frame side bars, and the said adjusting bars, for the purpose described.

JAMES E. METHVIN.

Copies of this patent may be obtained for five cents each, by addressing the "Commissioner of Patents, Washington, D. C."